United States Patent [19]

Crookshanks

[11] Patent Number: 4,737,952
[45] Date of Patent: Apr. 12, 1988

[54] TIME BASE CONVERTER EMPLOYING TWO REFERENCE POSITION PHASE LOCK LOOP

[75] Inventor: Rex J. Crookshanks, Palos Verdes Estates, Calif.

[73] Assignee: Hughes Aircraft Company, Los Angeles, Calif.

[21] Appl. No.: 882,064

[22] Filed: Jul. 3, 1986

[51] Int. Cl.$^4$ .............................................. H04J 3/22
[52] U.S. Cl. ...................................................... 370/84
[58] Field of Search .................... 370/84, 112, 50, 70, 370/123, 100, 72

[56] References Cited

U.S. PATENT DOCUMENTS

| | | | |
|---|---|---|---|
| 4,377,860 | 3/1983 | Godbole | 370/84 |
| 4,612,573 | 9/1986 | Grallert et al. | 370/84 |
| 4,641,303 | 2/1987 | Vogl | 370/84 |

Primary Examiner—Douglas W. Olms
Assistant Examiner—Frank M. Scutch, III
Attorney, Agent, or Firm—S. M. Mitchell; M. J. Meltzer; A. W. Karambelas

[57] ABSTRACT

A time base converter employs a two position, phase lock loop (40) to write twice orthogonally spaced signals into a split phase memory (34), which in turn can be read out at the timing rate of an incorporating communications system. The converter effectively converts the time base of signals read out of a demodulator (14) to the system time base, thus permitting use of the demodulator in computer based, digital processing systems. Readout of the signals is facilitated by a pair of marker tones $f_H$, $f_L$ which are introduced into the signal on the upper and lower sides of the input bandwidth. The signal is digitized by A/D converters (28, 30) and the resulting data is employed to drive the phase lock loop. The phase lock loop includes a counter (44) driven by a voltage controlled oscillator (46) which time shares a pair of loop filters (52, 54) that respectively pass the marker tones $f_H$, $f_L$. The counter is clocked at the orthogonal timing rate such that the demodulated data signals are read out on even counts and the marker tones are sampled on odd counts. A controller (38) forms a pair of gates for sampling the marker tones and the phase lock loop servos to the center of each gate time.

3 Claims, 3 Drawing Sheets

SAMPLING TIMES
AND GATE TIMES FOR
DISCRIMINATE

PULSE POSITION
RELATIVE TO
SAMPLING TIME

RESULTANT DISCRIMINATE
VERSUS RELATIVE TIME

TIME BASE CONVERTER EMPLOYING TWO REFERENCE POSITION PHASE LOCK LOOP

BACKGROUND OF THE INVENTION

The present invention broadly relates to processing cyclic analog signals in communication systems, and deals more particularly with a device for converting the time base of the signals for the purpose of reading out data signals from a demodulator or the like, to a related communications system at the system clock rate.

Communication systems typically employ demodulators demodulating analog signals which are subsequently processed by analog circuit to readout the communications data from the demodulator. For example, an FDM (frequency division multiplexed) signal may be demodulated into a TDM (time division multiplexed) signal by an analog processing circuit having frequency sweep and analog dispersion sections which convert the FDM signal into a cyclic signal consisting of a series of pulse segments. Each pulse segment corresponds to a communication channel and includes a plurality of pulses conveying information on that channel. It is often desired, however, to employ these demodulators in computer based signal processing systems having a time base which is different from that of the demodulator.

Analog processing circuits of the type mentioned above typically include analog components whose operating characteristics vary with changes in temperature; these changes in temperature result in alteration of the relative timing of the pulse segments output by the demodulator.

The foregoing factors involving timing differences between systems and undesired changes in signal timing within a system, render these demodulators relatively imcompatible with many types of communications systems, and especially those employing digital type signal processors. It would therefore be desirable to normalize the relative timing rate of the pulse segments output by the demodulator so that they can be read out at a constant rate, and it would also be desirable to be able to read out these signals at the clock rate of a digital signal processing system.

SUMMARY OF THE INVENTION

In accordance with the present invention, a time base converter employing a two position phase lock loop allows readout of twice orthogonally spaced signals into a split phase memory which in turn can be clocked out at the timing rate of an incorporating communications system. The converter effectively converts the time base of signals read out ofa demodulator to the system time base, thus permitting use of the demodulator in computer based, digital processing systems.

The demodulator may typically include provision for converting FDM (frequency division multiplex) signals to TDM (time division multiplexed) signals using FSK (frequency shift keying) techniques. The output of the demodulator consists of groups of pulses or pulse segments wherein the time base for the segments differs from that of the incorporating communications system and is not necessarily a multiple of the frequency of the pulses which make up each pulse segment.

In order to read out the twice orthogonally spaced signals into a split phase memory, a pair of marker tones are introduced into the signal on the upper and lower sides of the input bandwidth. The TDM signal along with the marker tones is I, Q translated down to a carrier frequency close to zero, and is then converted from analog to digital format. A digital combiner performs a square root of the sum of the squares on the digital data in order to determine the amplitude of the envelope of the signal at the sampling time, and the resulting pulse data is written into a split phase memory until such data can be readout at the system timing rate.

According to another aspect of the invention, the timing of the analog to digital conversion and writing of the pulse data into the split phase memory is determined by a two reference position phase lock loop which employs a common VCO (voltage controlled oscillator). The phase lock loop simultaneously tracks two reference positions in a cyclic signal even though the time spacing between the two reference positions in the cycle is not commensurate with respect to the time period of the cycle itself. The two reference positio phase lock loop allows one segment of the cycle to be divided up into accurate time reference increments but yet permits integration of these segments over a number of cycles in order to reduce jitter. In the illustrated embodiment, the two reference position phase lock loop includes a counter which is clocked at the orthogonal timing rate, such that the pulse data is read out on even counts and the marker tones are sampled on odd counts. The phase lock loop is alternately driven through a pair of filters which respectively pass the marker tone pulses. A controller forms a pair of gates for sampling the marker tone pulses and the phase lock loop servos to the center of each gate time. The phase lock loop thus functions, in effect, as a phase integrator which forces a phase match between two sets of cyclic signals.

DESCRIPTION OF THE PREFERRED EMBODIMENTS

Figure 1:
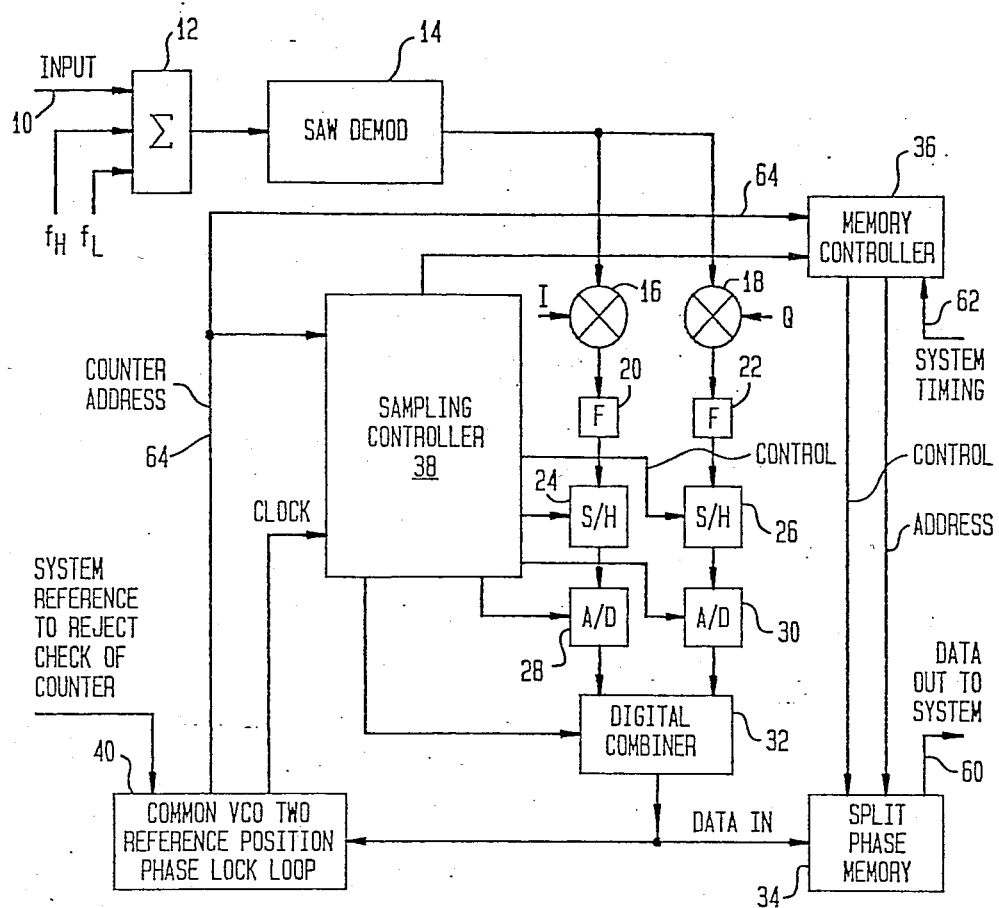
FIG. 1 is a block diagram of a time base converter employing a two position phase lock loop for reading out signals from a demodulator to a digital signal processing system, which forms the preferred embodiment of the present invention.

Referring first to FIG. 1, the present invention broadly relates in one aspect to a time base converter which may be used, by way of example, for reading out data signals from a demodulator 14 or the like, where the time base of the demodulated data signals must be converted in order to read the data to a computer based digital system (not shown) which interfaces with or incorporates the demodulator 14.

The incoming signal to the democulator 14 is received on an input line 10 and may consist of, by way of example, an FDM (frequency division multiplexed) signal which may be more particularly characterized as a multiplexed frequency shift keyed (MFSK) signal havign a predetermined frequency range. Within this frequency range are included a multitude of narrow band channels, each assignable to a frequency shift keyed (FSK) signal. The incoming FDM signals are depicted as the "input frequency band" in FIG. 3. Each FSK channel represents a stream of binary data at a predetermined, common baud rate. All channels switch from one bit or symbol to the next simultaneously.

Figure 3:
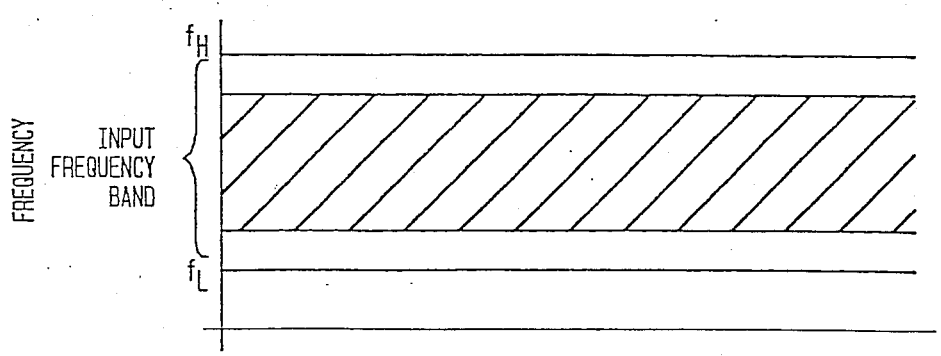
FIG. 3 is a frequency-time waveform plot of the modulated, FDM input signals.

The FDM input signal on line 10 is combined with a pair of marker frequency (tone) signals, $f_H$ and $f_L$ via a summer 12. As shown in FIG. 3, marker signal $f_H$ is at the top and outside of the input frequency band, while marker signal $f_L$ is at the bottom of and below the input frequency band.

The demodulator 14 may be of the well known surface acoustic wave type (SAW) which employ a pair of frequency x delay dispersion sections and an intervening frequency sweep section. The first dispersion section introduces delays as a function of frequency to the incoming signal and the frequency sweep converts the frequency components of the dispersed signal into a series of sweeps. The second dispersion section collapses each sweep into a pulse. Thus, the demodulator 14 functions to convert the FDM signal into a TDM (time division multiplex) signal such that the output of the demodulator 14 is a series of TDM pulse segments. For example, if the baud rate of the input signal is 10 kHz, each symbol has a duration of 100 microseconds and the output of the demodulator 14 is a series of 100 microsecond segments, each comprising 1000 "pulse windows" spaced 100 nanoseconds apart. The pulse spacings may be decreased to provide slack between the TDM segments to accommodate the inclusion of the marker signals $f_H$ and $f_L$.

The sweep rate (and thus the timing of the pulse segments) of the demodulator's frequency sweep section is not necessarily a multiple of the frequency of the pulses in each pulse segment. Moveover, the dispersion sections possess analog components whose operating characteristics change with temperature, thereby altering the rate at which the pulse segments are output by the demodulator 14.

Figure 4:
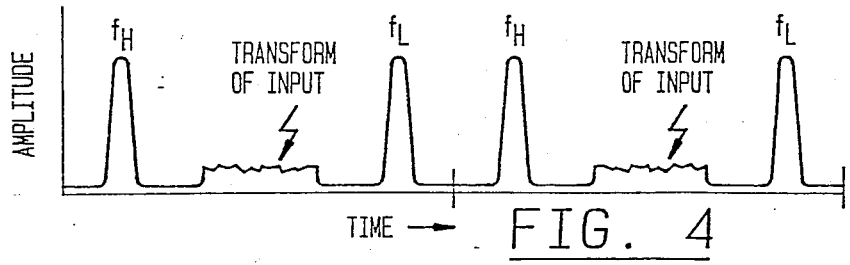
FIG. 4 is the amplitude-time waveform plot of the signal output by the demodulator.

The output signal from the demodulator 14, shown in FIG. 4, consists of a Fourier transform of the input and includes a series of TDM pulse segments and a pair of marker pulses corresponding to the marker signals $f_H$ and $f_L$. The marker pulses $f_H$ and $f_L$ are at one of the twice orthogonal spacings from the data pulses. As will be discussed below in more detail, the transform of the input is digitized, and stored in a split phase memory 34 unit it can be read out of memory 34 to an incorporating communications system or other digital processing system at the clock rate of that system.

The signal output from the demodulator 14 is delivered to an I, Q translate 16, 18 which translates the pulses to a frequency close to baseband. The in-phase and quadra-phase components of the signals are then respectively passed through filters 20, 22 which filter out the upper side band. A pair of sample and hold units 24, 26 hold the filtered signal, typically for 0.1 of the time of the orthogonal spacing, thereby to provide a constant signal level for use in A/D converters 28, 30 which convert the analog signal into an 8 bit digital word. The digital signal is then processed by a digital combiner 32 which performs a square root of the sum of the squares on the digital I, Q signals (words) thereby forming the amplitude of the envelope of the signal at the sample time. The sample time is determined by a sampling controller 38 which in turn receives timing signals from a later discussed phase lock loop 40.

The data output by the digital combiner 32 consisting of the pulses for each TDM pulse segment as well as the marker signals, is delivered to a split phase memory 34 as well as to the input of the phase lock loop 40.

Data from the digital combiner 32 is written into the split phase memory 34 at a clock rate determined by the phase lock loop 40, but is read out of the memory 34 on line 60 at the "system" clock rate (line 62) of the incorporating communications system. Data is read out of the split phase memory 34 in accordance with control and address signals generated by a memory controller 36. The memory controller 36 receives address and timing signals from the incorporating communications system on line 62, and also receives internal control signals from the sampling controller 38 as well as address signals delivered on line 64 from the phase lock loop 40.

Figure 2:
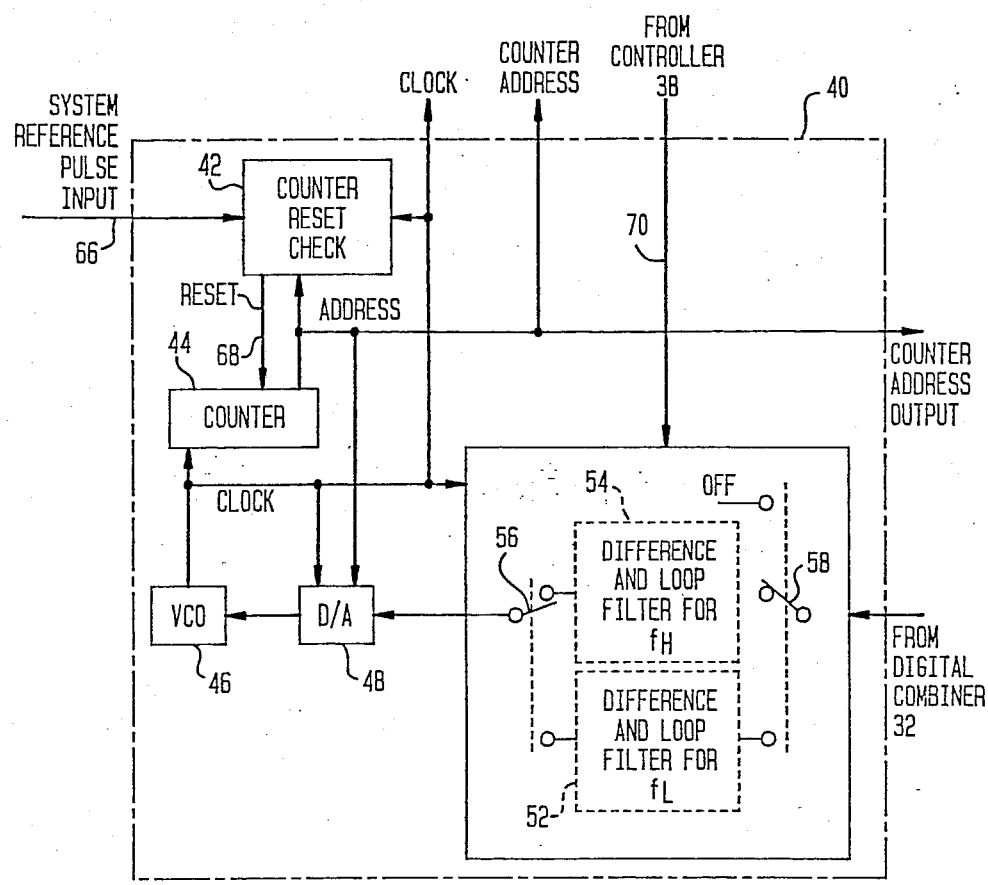
FIG. 2 is a block diagram of the two reference position phase lock loop employing a common voltage controlled oscillator.

Referring now also to FIG. 2, the phase lock loop 40 has two reference positions and employs a common VCO (voltage controlled oscillator) 46. The phase lock loop 40 simultaneously tracks two reference positions, i.e. marker signals $f_H$ and $f_L$, in a cyclical signal even though the time spacing between the two reference signals in the cycle is not commensurate with respect to the time period of the cycle itself. Thus, it may be appreciated that the phase lock loop 40 may be employed in various applications other than the particular time base converter disclosed herein, where it is desired to divide up one of the time segments of the cycle into very accurate time references using a counter and where it is also desired to integrate the segments over a great number of cycles in order to reduce jitter.

Figure 5:
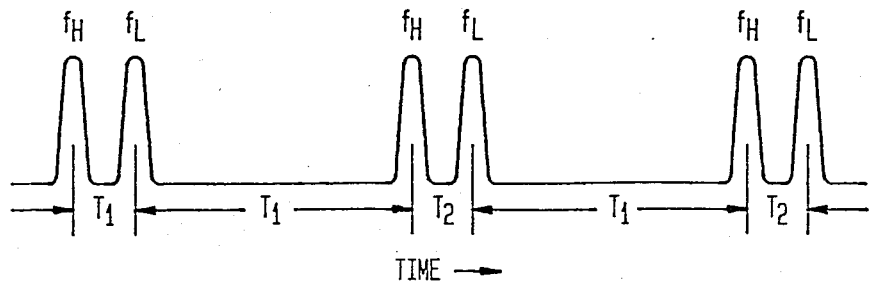
FIG. 5 is an amplitude-time waveform plot of several cycles of a signal containing two marker tone pulses.

For example, FIG. 5 depicts an amplitude-time plot of several cycles of a signal containing two pulses, where it is desired to accurately scale or divide up the time between the pulses for signal processing purposes. Assume for the moment that it is desired to accurately scale or divide up the interval $T_1$. Note, however, that period $T_1$ is not a commensurate number with respect to $T_1+T_2$. The two reference position phase lock loop 40 shown in FIG. 2 provides for dividing the $T_1$ interval such that it can be scaled notwithstanding that $T_1$ is not necessarily a multiple of $T_1+T_2$.

As shown in FIG. 2, phase lock loop 40 includes a reset check counter 42 which includes an input line 66 for receiving system reference pulses which are output from the demodulator 14 (FIG. 1). The reset check counter 42 is employed for controlling the locaton of a later discussed discriminate window which encompasses the $f_H$ and $f_L$ pulses. If these latter mentioned pulses do not appear within the discriminate window range, the reset check counter 42 delivers a reset signal on line 68 to a counter 44 which resets the latter such that the marker pulses $f_H$ and $f_L$ are within the discriminate window range on their next occurrence in time.

The counter 44 generates the counter address on line 64 which is employed to control the sampling controller 38 and memory controller 36 (FIG. 1). The counter 44 is driven by clock pulses generated by a VCO 46 which in turn is controlled by an analog signal derived from a D/A converter 48.

The VCO 46 is time shared between a pair of digital loop filters 52, 54 which feed the D/A converter 48. The loop filters 52, 54 respectively pass only the marker pulses $f_L$ and $f_H$. The loop filters 52, 54 are selectively connected between the output of the digital combiner 32 (FIG. 1) and the input of the D/A converter 48 by a pair of digitally operated switches 56, 58 which are controlled by clock pulses derived from the VCO 46 and control signals generated by the sampling controller on line 70.

Figure 6:
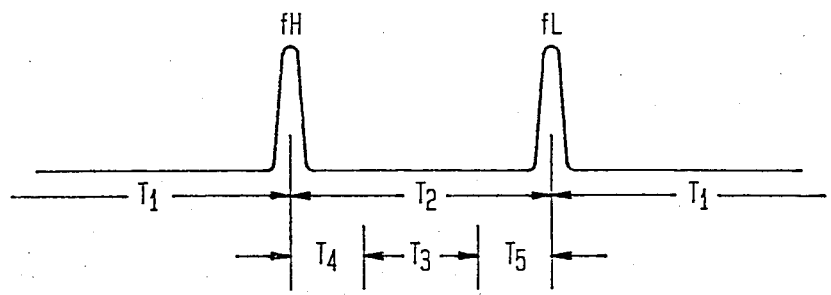
FIG. 6 is an amplitude-time waveform plot depicting the details of the time periods during which the VCO is shared between the loop filters.

As shown in FIG. 6, the VCO 46 is connected to filter 54 for the time period $T_3$, and is connected to filter 52 during the time periods $T_1$, $T_4$ and $T_5$.

Figure 7:
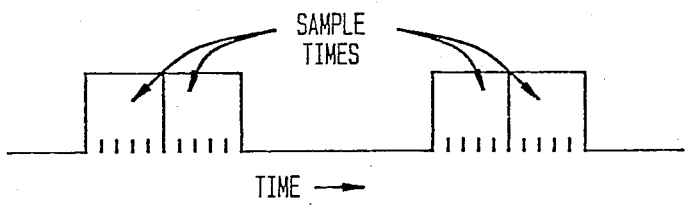
FIG. 7 is an amplitude-time waveform plot showing sampling times and gate times for the discriminates.
Figure 8:
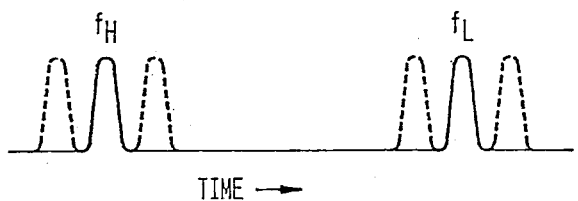
FIG. 8 is an amplitude-time waveform plot showing the pulse position relative to sampling time.
Figure 9:
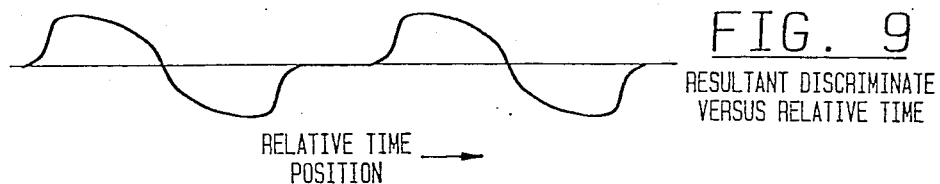
FIG. 9 is an amplitude-time waveform plot showing the resultant discriminate.

The sampling controller 38 (FIG. 1) produces two sampling gates for the discriminate window as shown in Figure 7. During these gates, the sampling controller 38 controls the respective loop filters 52, 54 to sum the digital signals received from the digital combiner 32. The difference of the sums defines an error signal or resultant discriminate, depicted in FIG. 9, due to the relative time difference of the position of the incoming pulses indicated in FIG. 8. The phase lock loop 40 thus forces the loops to servo to the center of each time gate. In the foregoing description it is assumed that the marker pulses $f_H$ and $f_L$ are wide enough to be sampled two or more times during their existence.

Each of the virtual phase lock loops described above is of second order, consequently each of the loop filters 52, 54 is also second order. From the foregoing, it is apparent that the two loops are coupled with each other, with the error signal from the $f_H$ pulse controlling the length of the time interval $T_3$ and with the error signal from the $f_L$ pulse controlling the remainder of the time interval, $T_1$, $T_4$ and $T_5$, of the cycle. Since the counter 44 is servoed to track the center of the $f_H$ pulse by its "$f_H$ gate", the count address stored in the counter 44 properly scales the time between the $f_H$ pulse and the $f_L$ pulse during the time period $T_1$.

Since the two loops are coupled, the bandwidth of the $f_H$ loop filter 54 is an order of magnitude larger than the bandwidth of the $f_L$ loop filter 52. As a result, during lock-up, the $f_H$ pulse is locked first and the $f_L$ is then servoed into position.

From the foregoing, it is apparent that the time base converter described above is useful in various application where it is desired to convert the time base of a set of signals having an inherent time base to a system having a different time base. It is recognized, of course, that those skilled in the art may make various modifications or additions to the illustrated embodiment chosen to illustrate the invention without departing from the spirit and scope of the present contribution of the art. For example, the time base converter may be used in various applications other than the particular demodulator disclosed herein. Moreover, the two reference position phase lock loop employing a common VCO may be used in applications other than the particular time base converter which forms the preferred embodiment of the present invention. Accordingly, it is understood that the protection sought and to be afforded hereby should be deemed to extend to the subject matter claimed and all equivalents thereof fairly within the scope of the invention.

What is claimed is:

1. For use in processing a signal which includes a plurality of successive signal segments occurring at a first rate of time where said first time rate varies in accordance with at least one parameter, a device for converting said signal segments from said first time rate to a second time rate wherein said second time rate is independent of said parameter, comprising:

means for injecting a plurality of reference timing pulses into said signal to form a composite signal, said timing pulses including first and second reference timing pulses associated with each of said signal segments and occurring respectively before and after the associated signal segment;

means for receiving said composite signal;

means coupled with said receiving means for converting said signal segments and said reference timing pulses into digital data;

memory means for storing digital data representing said signal segments, said memory means including a data input coupled with said converting means for receiving said digital data representing said signal segments, a data output coupled with a system to which said digital data representing said signal segments is to be delivered at said second time rate, and a control input; and, control means coupled with said converting means and the control input of said memory means for receiving digital data from said converting means representing said timing pulses and for delivering control signals to the control input of said memory means to read out digital data stored in said memory means at said second time rate irrespective of variances in said first time rate, said control means including
   (1) first and second filters for respectively passing only digital data corresponding to said first and second timing pulses,
   (2) clock means for producing clock signals using digital data representing said first and second timing pulses,
   (3) means for alternately coupling said first and second filters with said clock means whereby to alternately drive said clock means with digital data representing said first and second timing pulses, and
   (4) means responsive to said clock signals for generating said control signals.

2. The device of claim 1, wherein said clock means includes:

means for converting said digital data representing said first and second timing pulses to an analog signal; and a voltage controlled oscillator having a clock signal output and an input for receiving said analog signal.

3. The device of claim 2, wherein said control signal generating means includes:

a counter responsive to said clock signals for generating a count and outputting said control signals; and means responsive to timing signals occurring at said second time rate for resetting said counter.

* * * * *